US010209628B2

(12) United States Patent
Uppaluri et al.

(10) Patent No.: US 10,209,628 B2
(45) Date of Patent: Feb. 19, 2019

(54) SYSTEM AND METHOD FOR DEFECT CLASSIFICATION BASED ON ELECTRICAL DESIGN INTENT

(71) Applicant: KLA-Tencor Corporation, Milpitas, CA (US)

(72) Inventors: Prasanti Uppaluri, Saratoga, CA (US); Thirupurasundari Jayaraman, Chennai (IN); Ardis Liang, Pleasanton, CA (US); Srikanth Kandukuri, Chennai (IN); Sagar Kekare, Milpitas, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 69 days.

(21) Appl. No.: 15/285,111

(22) Filed: Oct. 4, 2016

(65) Prior Publication Data

US 2017/0344695 A1 Nov. 30, 2017

Related U.S. Application Data

(60) Provisional application No. 62/341,765, filed on May 26, 2016.

(51) Int. Cl.
*G06F 17/50* (2006.01)
*G03F 7/20* (2006.01)

(52) U.S. Cl.
CPC ........ *G03F 7/7065* (2013.01); *G03F 7/70658* (2013.01); *G06F 17/5081* (2013.01); *G06F 2217/12* (2013.01)

(58) Field of Classification Search
None
See application file for complete search history.

(56) References Cited

U.S. PATENT DOCUMENTS

| 5,805,278 | A | 9/1998 | Danko |
| 6,621,570 | B1 | 9/2003 | Danko |
| 7,035,447 | B2 * | 4/2006 | Take .................. G01N 21/9501 382/145 |
| 7,092,082 | B1 | 8/2006 | Dardzinski |
| 7,570,796 | B2 | 8/2009 | Zafar et al. |
| 7,676,077 | B2 | 3/2010 | Kulkarni et al. |

(Continued)

OTHER PUBLICATIONS

International Search Report dated Jul. 19, 2017 for PCT/US2017/026220.

*Primary Examiner* — Leigh M Garbowski
(74) *Attorney, Agent, or Firm* — Suiter Swantz pc llo

(57) ABSTRACT

A method for automatically classifying one or more defects based on electrical design properties includes receiving one or more images of a selected region of a sample, receiving one or more sets of design data associated with the selected region of the sample, locating one or more defects in the one or more images of the selected region of the sample by comparing the one or more images of the selected region of the sample to the one or more sets of design data, retrieving one or more patterns of interest from the one or more sets of design data corresponding to the one or more defects, and classifying the one or more defects in the one or more images of the selected region of the sample based on one or more annotated electrical design properties included in the one or more patterns of interest.

40 Claims, 4 Drawing Sheets

(56) References Cited

U.S. PATENT DOCUMENTS

| | | | |
|---|---|---|---|
| 7,707,542 B1* | 4/2010 | Gennari | G06F 17/5068 |
| | | | 430/5 |
| 7,752,584 B2* | 7/2010 | Yang | G06F 17/5081 |
| | | | 430/30 |
| 7,818,707 B1* | 10/2010 | Gennari | G06F 17/5068 |
| | | | 716/104 |
| 8,079,005 B2* | 12/2011 | Lai | G06F 17/5081 |
| | | | 716/111 |
| 8,631,373 B1* | 1/2014 | Gennari | G06F 17/5068 |
| | | | 716/118 |
| 8,664,594 B1 | 3/2014 | Jiang et al. | |
| 8,692,204 B2 | 4/2014 | Kojima et al. | |
| 8,698,093 B1 | 4/2014 | Gubbens et al. | |
| 8,716,662 B1 | 5/2014 | MacDonald et al. | |
| 8,832,621 B1* | 9/2014 | Gennari | G06F 17/50 |
| | | | 716/112 |
| 8,923,600 B2 | 12/2014 | Zafar et al. | |
| 9,081,289 B2* | 7/2015 | Chang | G06F 17/5068 |
| 9,275,450 B2* | 3/2016 | Ramachandran | G06T 7/0004 |
| 9,293,298 B2* | 3/2016 | Lauber | H01J 22/12 |
| 9,558,858 B2 | 1/2017 | Shortt et al. | |
| 9,846,934 B2* | 12/2017 | Zafar | G06T 7/001 |
| 2013/0279794 A1* | 10/2013 | Greenberg | G06T 7/001 |
| | | | 382/149 |
| 2014/0301629 A1 | 10/2014 | Ramachandran | |
| 2015/0022654 A1* | 1/2015 | Greenberg | H01J 37/00 |
| | | | 348/80 |
| 2015/0048741 A1 | 2/2015 | Shortt et al. | |
| 2015/0179400 A1 | 6/2015 | Lauber | |
| 2015/0317424 A1* | 11/2015 | Chang | G06F 17/5068 |
| | | | 716/53 |
| 2015/0333471 A1 | 11/2015 | Chimmalgi et al. | |
| 2015/0357179 A1 | 12/2015 | Wilson et al. | |
| 2018/0033132 A1* | 2/2018 | Zafar | G06T 7/001 |

* cited by examiner

SYSTEM AND METHOD FOR DEFECT CLASSIFICATION BASED ON ELECTRICAL DESIGN INTENT

PRIORITY

The present application claims priority under 35 U.S.C. § 119(e) to U.S. Provisional Patent Application Ser. No. 62/341,765, filed May 26, 2016, entitled METHOD FOR DEFECT CLASSIFICATION BASED ON ELECTRICAL DESIGN INTENT naming Prasanti Uppaluri, Thirupurasundari Jayaraman, Ardis Liang, and Srikanth Kandukuri as inventors, which is incorporated herein by reference in the entirety.

TECHNICAL FIELD

The present invention generally relates to wafer inspection and review, and, more particularly, to classifying defects based on electrical design intent during wafer inspection and review.

BACKGROUND

Fabricating semiconductor devices such as logic and memory devices typically includes processing a substrate such as a semiconductor wafer using a large number of semiconductor fabrication processes to form various features and multiple levels of the semiconductor devices. Multiple semiconductor devices may be fabricated in an arrangement on a single semiconductor wafer and then separated into individual semiconductor devices.

Semiconductor devices may develop defects during the fabrication processes. Inspection processes are performed at various steps during a semiconductor manufacturing process to detect defects on a specimen. Inspection processes are an important part of fabricating semiconductor devices such as integrated circuits, becoming even more important to successfully manufacture acceptable semiconductor devices as the dimensions of semiconductor devices decrease. For instance, detection of defects has become highly desirable as the dimensions of semiconductor devices decrease, as even relatively small defects may cause unwanted aberrations in the semiconductor devices. As such, it would be desirable to provide a solution for improved wafer inspection and defect classification to resolve manufacturing issues and provide improved wafer inspection capabilities.

SUMMARY

A system for automatically classifying one or more defects based on electrical design properties is disclosed, in accordance with one or more embodiments of the present disclosure. In one illustrative embodiment, the system includes an imaging tool. In another illustrative embodiment, the system includes a user interface. In another illustrative embodiment, the user interface includes a display and a user input device. In another illustrative embodiment, the system includes a controller. In another illustrative embodiment, the controller includes one or more processors configured to execute a set of program instructions stored in memory. In another illustrative embodiment, the program instructions are configured to cause the one or more processors to receive one or more images of a selected region of a sample. In another illustrative embodiment, the program instructions are configured to cause the one or more processors to receive one or more sets of design data associated with the selected region of the sample. In another illustrative embodiment, a set of design data includes one or more layers. In another illustrative embodiment, a layer includes one or more sets of shapes. In another illustrative embodiment, the program instructions are configured to cause the one or more processors to locate one or more defects in the one or more images of the selected region of the sample by comparing the one or more images of the selected region of the sample to the one or more sets of design data. In another illustrative embodiment, the program instructions are configured to cause the one or more processors to retrieve one or more patterns of interest from the one or more sets of design data corresponding to the one or more defects. In another illustrative embodiment, the one or more patterns of interest include one or more annotated electrical design properties. In another illustrative embodiment, the pattern of interest is represented by one or more shapes. In another illustrative embodiment, the program instructions are configured to cause the one or more processors to classify the one or more defects in the one or more images of the selected region of the sample based on the one or more annotated electrical design properties.

A system for annotating one or more sets of design data with electrical design properties for defect classification is disclosed, in accordance with one or more embodiments of the present disclosure. In one illustrative embodiment, the system includes a user interface. In another illustrative embodiment, the user interface includes a display and a user input device. In another illustrative embodiment, the system includes a controller. In another illustrative embodiment, the controller includes one or more processors configured to execute a set of program instructions stored in memory. In another illustrative embodiment the program instructions are configured to cause the one or more processors to receive one or more sets of design data. In another illustrative embodiment, a set of design data includes one or more layers. In another illustrative embodiment, a layer includes one or more sets of shapes. In another illustrative embodiment the program instructions are configured to cause the one or more processors to receive a selection of a pattern of interest in the one or more sets of design data from the user input device. In another illustrative embodiment, the pattern of interest is represented by one or more shapes. In another illustrative embodiment the program instructions are configured to cause the one or more processors to annotate the pattern of interest in the one or more sets of design data with one or more electrical design properties associated with the selected pattern of interest.

A method for automatically classifying one or more defects based on electrical design properties is disclosed, in accordance with one or more embodiments of the present disclosure. In one illustrative embodiment, the method may include, but is not limited to, receiving one or more images of a selected region of a sample. In another illustrative embodiment, the method may include, but is not limited to, receiving one or more sets of design data associated with the selected region of the sample. In another illustrative embodiment, the one or more sets of design data correspond to the selected region of the sample. In another illustrative embodiment, a set of design data includes one or more layers. In another illustrative embodiment, a layer includes one or more sets of shapes. In another illustrative embodiment, the method may include, but is not limited to, locating one or more defects in the one or more images of the selected region of the sample by comparing the one or more images of the selected region of the sample to the one or more sets of design data. In another illustrative embodiment, the method may include, but is not limited to, retrieving one or more patterns of interest from the one or more sets of design data corresponding to the one or more defects. In another illustrative embodiment, the pattern of interest is represented by one or more shapes. In another illustrative embodiment, the one or more patterns of interest include one or more annotated electrical design properties. In another illustrative embodiment, the method may include, but is not limited to, classifying the one or more defects in the one or more images of the selected region of the sample based on the one or more annotated electrical design properties.

A method for annotating one or more sets of design data with electrical design properties for defect classification is disclosed, in accordance with one or more embodiments of the present disclosure. In one illustrative embodiment, the method may include, but is not limited to, receiving one or more sets of design data. In another illustrative embodiment, a set of design data includes one or more layers. In another illustrative embodiment, a layer includes one or more sets of shapes. In another illustrative embodiment, the method may include, but is not limited to, receiving a selection of a pattern of interest in the one or more sets of design data from the user input device. In another illustrative embodiment, the pattern of interest is represented by one or more shapes. In another illustrative embodiment, the method may include, but is not limited to, annotating the pattern of interest in the one or more sets of design data with one or more electrical design properties associated with the selected pattern of interest.

It is to be understood that both the foregoing general description and the following detailed description are exemplary and explanatory only and are not necessarily restrictive of the present disclosure. The accompanying drawings, which are incorporated in and constitute a part of the characteristic, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION OF THE INVENTION

Figure 1A:
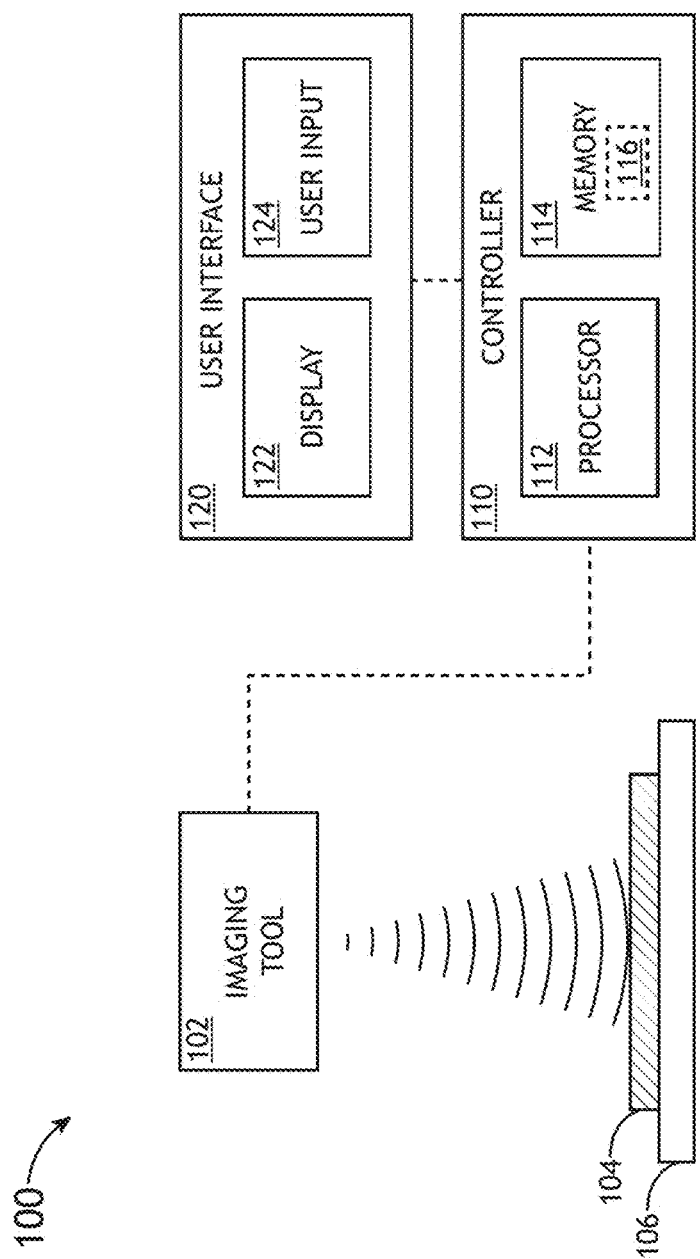
FIG. 1A illustrates a block diagram of a system for wafer inspection, in accordance with the present disclosure.

Reference will now be made in detail to the subject matter disclosed, which is illustrated in the accompanying drawings.

Referring generally to FIGS. 1A-3, a system and method for wafer electrical design property annotation and defect classification is disclosed in accordance with the present disclosure.

Embodiments of the present disclosure are directed to a system and method for annotating design data with electrical design properties, where the electrical design properties are attributed to one or more defect characteristics and used to determine the criticality of a defect on those electrical devices or interconnect.

For purposes of the present disclosure, the terms "design" and "design data" as used herein generally refer to the physical design (layout) of an integrated circuit (IC) and data derived from the physical design through complex simulation or simple geometric and Boolean operations. For example, the physical design may be stored in a data structure such as a Graphic Data System (GDS) file, any other standard machine-readable file, any other suitable file known in the art, and a design database. IC layout data or chip design data is provided in a number of formats including, but not limited to, GDSII and OASIS formats. A GDSII file is one of a class of files used for the representation of design layout data. Other examples of such files include, but are not limited to, GL1 and OASIS files and proprietary file formats such as Reticle Design File (RDF) data, which is proprietary to KLA-Tencor, Milpitas, Calif. ("KT"). Design data is encoded with the manufacturing, logical, and electrical intent of the particular chip. Design data may be an output of Electronic Design Automation (EDA) tools. For example, the design data output from EDA tools may be processed by analysis software and converted to RDF format.

It is noted herein an image of a reticle acquired by a reticle inspection system and/or derivatives thereof may be used as a "proxy" or "proxies" for the design. Such a reticle image or a derivative thereof may serve as a substitute for the design layout in any embodiments described herein that use a design. The design may include any other design data or design data proxies described in U.S. Pat. No. 7,570,796 issued on Aug. 4, 2009 to Zafar et al., and U.S. Pat. No. 7,676,077 issued on Mar. 9, 2010 to Kulkarni et al., both of which are incorporated by reference in their entirety. In addition, the design data may be standard cell library data, integrated layout data, design data for one or more layers, derivatives of the design data, and full or partial chip design data.

It is further noted herein, simulated or acquired images from a wafer or reticle may be used as a proxy for the design. Image analysis may also be used as a proxy for design analysis. For example, polygons in the design may be extracted from an image of a design printed on a wafer and/or reticle, assuming that the image of the wafer and/or reticle is acquired with sufficient resolution to adequately image the polygons of the design.

The extraction of electrical intent from the chip design data may be automated or manual based on type of design data available to a user. A rule-driven EDA class of tools such as Layout Versus Schematic (LVS) may be used to automatically extract the electrical intent from the design data. For instance, LVS tools require all design layers, including text layers, along with connectivity rules to automatically extract the electrical intent of the chip design. Where a complete set of design layers is not available to the user, a user-driven solution may be provided. However, where a rule-driven or user-driven solution in not available, electrical intent of the design data is not available to be extracted. As such, it would be desirable to annotate the design data with the electrical intent of the design, to provide the information to a user or a controller for use during wafer inspection and review processes.

Additional embodiments of the present disclosure are directed to a system and method for receiving sample inspection images and classifying defects found in the sample inspection images. A defect may be classified by comparing the defect to design data annotated with electrical design properties, where electrical design properties include defect characteristic and criticality of the defect. Criticality of a defect is defined by its location. Defects on critical structures impact the electrical integrity of the device. Classifying defects based on defect characteristic and level of criticality to the semiconductor wafer promotes proper classification of defects following fabrication, including where most or all of an electrical pattern is missing from the semiconductor wafer.

For purposes of the present disclosure, a defect may be classified as a void, short, particle, residue, scum, or any other defect known in the art. Defects may be classified as nuisances (defects having low criticality) or material failures (defects having high criticality). The criticality of a defect is defined by its location and the electrical intent at that location. For example, defects in redundant electrical structures placed for better manufacturability that do not impact the electrical integrity of the device are of lower criticality (e.g. nuisances) than defects in a singular electrical structure (e.g. material failures). For instance, a defect in or on a floating net may be less critical than a defect in or on a power line or ground line.

In some cases where a defect is present, a wafer may be missing all or a large portion of an electrical structure (e.g., a via or a contact). In this situation, a user may not have enough information about the electrical structure to correctly determine the impact of the defect through visual inspection alone, as the defect may be located in an empty region with no shapes. As a result, the user may misclassify the defect. For instance, a missing shape or portion of a shape may be incorrectly classified as a nuisance instead of a material error, or vice versa, because of the lack of shape data in the layer under inspection. This incorrect classification may result in lost earnings for the manufacturer, either in the form of unnecessary re-printing of nuisance chips or the replacement and compensation for chips with material failure that were believed to be only afflicted by nuisance defects. As such, it would be desirable to provide the electrical intent within the design data used for comparison during the inspection and review processes to provide the inspector with an additional resource for determining the criticality of a defect.

For purposes of the present disclosure, the terms electrical intent, electrical design intent, electrical property, electrical design property, and electrical pattern represent equivalent terms.

FIG. 1A illustrates a system 100 for sample inspection, in accordance with one or more embodiments of the present disclosure. In one embodiment, the system 100 includes an imaging tool 102. In another embodiment, the system 100 includes a sample 104 disposed on a sample stage 106. In another embodiment, the system 100 includes a controller 110. In another embodiment, the system 100 includes a user interface 120.

In another embodiment, the imaging tool 102 is configured to detect defects on the sample 104. For example, the imaging tool 102 may include any appropriate characterization tool known in the art such as, but not limited to, an inspection tool or review tool. For example, the imaging tool 102 may include, but is not limited to, an electron beam inspection or review tool (e.g., SEM system). By way of another example, the imaging tool 102 may include, but is not limited to, an optical inspection tool. For instance, the optical inspection tool may include a broadband plasma (BBP) inspection tool including, but not limited to, a laser sustained plasma (LSP) based inspection tool. In another instance, the optical inspection tool may include a narrowband inspection tool, such as, but not limited to, a laser scanning inspection tool. In addition, in the case of optical inspection, the imaging tool 102 may include, but is not limited to, a brightfield imaging tool, or a darkfield imaging tool. It is noted herein that the imaging tool 102 may include any optical system configured to detect illumination reflected, scattered, diffracted, and/or radiated from a surface of a sample 104. Examples of imaging tools are described generally in U.S. Pat. No. 7,092,082, issued on Aug. 8, 2006; U.S. Pat. No. 6,621,570, issued on Sep. 16, 2003; and U.S. Pat. No. 5,805,278, issued on Sep. 9, 1998, which are each herein incorporated by reference in the entirety. Example of imaging tools are also described generally in U.S. Pat. No. 8,664,594, issued Apr. 4, 2014; U.S. Pat. No. 8,692,204, issued Apr. 8, 2014; U.S. Pat. No. 8,698,093, issued Apr. 15, 2014; U.S. Pat. No. 8,716,662, issued May 6, 2014; U.S. patent application Ser. No. 14/699,781, filed on Apr. 29, 2015; U.S. patent application Ser. No. 14/667,235, filed on Mar. 24, 2015; and U.S. patent application Ser. No. 14/459,155, filed on Aug. 13, 2014 which are each herein incorporated by reference in the entirety.

In another embodiment, although not shown, the imaging tool 102 may include an illumination source, a detector and various optical components for performing inspection (e.g., lenses, beam splitters and the like). For example, the illumination source of the imaging tool 102 may include any illumination source known in the art. For instance, the illumination source may include, but is not limited to, a broadband light source or a narrowband light source. In addition, the illumination source may be configured to direct light to the surface of the sample 104 (via various optical components) disposed on the sample stage 106. Further, the various optical components of the imaging tool 102 may be configured to direct light reflected and/or scattered from the surface of the sample 104 to the detector of the imaging tool 102. By way of another example, the detector of the imaging tool 102 may include any appropriate detector known in the art. For instance, the detector may include, but is not limited to, photo-multiplier tubes (PMTs), charge coupled devices (CCDs), time delay integration (TDI) camera, and the like. In addition, the output of the detector may be communicatively coupled to the controller 110, described in detail further herein.

In one embodiment, the sample 104 includes a wafer. For example, the sample 104 may include, but is not limited to, a semiconductor wafer. As used throughout the present disclosure, the term "wafer" generally refers to substrates formed of a semiconductor or non-semi-conductor material. For instance, a semiconductor or semiconductor material may include, but are not limited to, monocrystalline silicon, gallium arsenide, and indium phosphide.

In another embodiment, the sample 104 is manufactured based on one or more sets of design data. In another embodiment, a set of design data includes one or more sets of layers. For example, such layers may include, but are not limited to, a resist, a dielectric material, a conductive material, and a semiconductive material. Many different types of such layers are known in the art, and the term wafer as used herein is intended to encompass a wafer on which all types of such layers may be formed. By way of another example, the one or more layers formed on the wafer may be repeated one or more times within the wafer. Formation and processing of such layers of material may ultimately result in completed devices. Many different types of devices may be formed on a wafer, and the term wafer as used herein is intended to encompass a wafer on which any type of device known in the art is being fabricated.

In another embodiment, a layer includes one or more sets of shapes. For example, the one or more sets of shapes may be repeated one or more times within the layer. By way of another example, a set of shapes may be regularly- or irregularly-shaped. In another embodiment, a shape is a polygon. The implementation of polygons when inspecting the design data of a device is generally described in U.S. Pat. No. 8,923,600, issued on Dec. 30, 2014; and U.S. patent application Ser. No. 14/178,866, filed on Feb. 12, 2014, which are each herein incorporated by reference in the entirety.

In another embodiment, the one or more sets of design data include one or more patterns of interest. For example, the one or more patterns of interest may be repeated one or more times within the one or more sets of design data. In another embodiment, a pattern of interest may be represented by one or more sets of shapes. In another embodiment, the pattern of interest may be a cell defined within the one or more sets of design data. It is noted herein a pattern of interest may correspond to a particular electrical intent of the one or more sets of design data. As used throughout the present disclosure, electrical intent of the one or more sets of design data includes, but is not limited to, a power line, a ground line, a timing line, a word line, a bit line, a data line, a logic line, and the like.

Figure 1B:
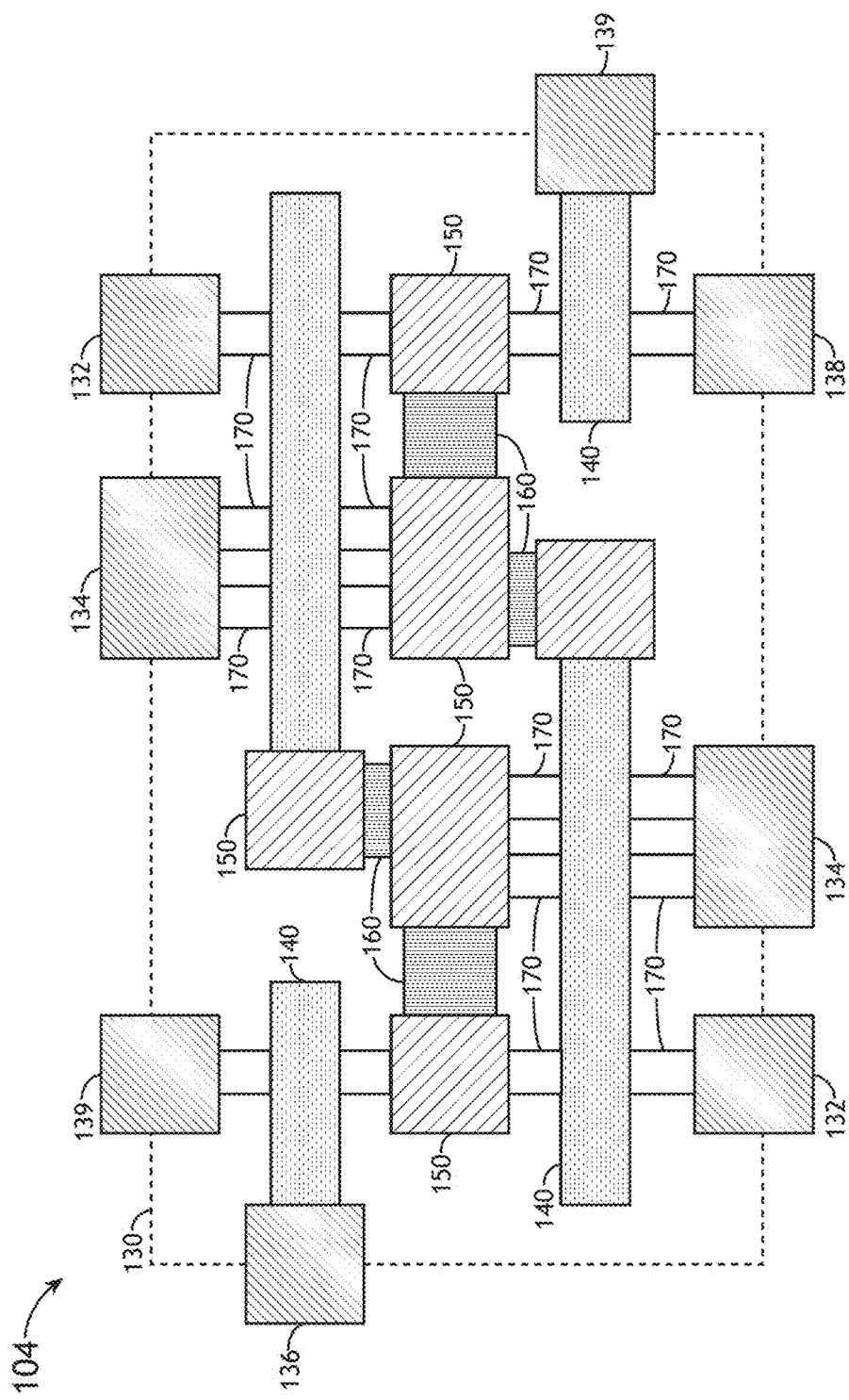
FIG. 1B illustrates a set of design data including one or more layers, in accordance with the present disclosure.

FIG. 1B illustrates one or more layers of a set of design data for the sample 104, in accordance with the present disclosure. In one embodiment, the set of design data includes a layer 130. In another embodiment, the layer 130 includes one or more polygons. For example, the layer 130 may have repeating polygons. For instance, the layer 130 may have a set of repeating polygons 132. Additionally, the layer 130 may have a set of repeating polygons 134. By way of another example, the layer 130 may have singular polygons. For instance, the layer 130 may have a singular polygon 136. Additionally, the layer 130 may have a singular polygon 138. By way of another example, the layer 130 may have one or more additional polygons 139. In another embodiment, a user may annotate the one or more polygons with one or more electrical properties. In one example, the one or more polygons may be annotated with electrical design properties for an SRAM bit cell. For instance, the user may annotate the set of repeating polygons 132 as a voltage source. Additionally, the user may annotate the set of repeating polygons 134 as a ground. Further, the user may annotate the polygon 136 as a word line. Further, the user may annotate the polygon 138 as a bit line.

It is noted herein that the one or more polygons 132, 134, 136, 138, 139 may be annotated with identical or different electrical design properties. It is further noted herein that additional or alternative polygons on the layer 130 may be annotated with one or more electrical design properties. For example, one or more polygons 132, 134, 136, 138, 139 need not be annotated with one or more electrical properties. By way of another example, a user may annotate any of the polygons illustrated in FIG. 1B with one or more electrical design properties. Therefore, the above description should not be interpreted as a limitation on the present invention but merely an illustration.

In another embodiment, the set of design data for the sample 104 includes one or more additional sets of polygons on one or more additional layers. For example, the set of design data for the sample 104 may include a set of polygons 140 on a layer. By way of another example, the set of design data for the sample 104 may include a set of polygons 150 on a layer. By way of another example, the set of design data for the sample 104 may include a set of polygons 160 on a layer. By way of another example, the set of design data for the sample 104 may include a set of polygons 170 on a layer.

In another embodiment, the sets of polygons 140, 150, 160, 170 may be on separate layers. It is noted herein, however, that one or more of the sets of polygons 140, 150, 160, 170 may be on the same layer. Additionally, it is noted herein the one or more of the sets of polygons 140, 150, 160, 170 may be on the layer 130, the layer 130 including polygons 132, 134, 136, 138, 139. Therefore, the above description should not be interpreted as a limitation on the present invention but merely an illustration.

Referring again to FIG. 1A, in another embodiment the sample stage 106 may include any appropriate mechanical and/or robotic assembly known in the art. For example, the sample stage 106 may be configured to actuate the sample 104 to a selected position or orientation. For instance, the sample stage 106 may include or may be mechanically coupled to one or more actuator, such as a motor or servo, configured to translate or rotate the sample 104 for positioning, focusing, and/or scanning in accordance with a selected inspection or metrology algorithm, several of which are known to the art.

In one embodiment, the controller 110 includes one or more processors 112 and a memory medium 114. In another embodiment, one or more sets of program instructions 116 are stored in memory medium 114. In another embodiment, the one or more processors 112 are configured to execute the sets of program instructions 116 to carry out one or more of the various steps described throughout the present disclosure.

In another embodiment, the user interface 120 is communicatively coupled to the one or more processors 112 of the controller 110. In another embodiment, the user interface 120 includes a display device 122. In another embodiment, the user interface 120 includes a user input 124.

In another embodiment, the controller 110 is configured to receive and/or acquire data or information from other systems or sub-systems (e.g., one or more sets of information from the imaging tool 102 or from any of the components of the imaging tool 102, or one or more user inputs received via the user interface 120) by a transmission medium that may include wireline and/or wireless portions. In another embodiment, the controller 110 of the system 100 is configured to transmit data or information (e.g., the output of one or more processes disclosed herein) to one or more systems or sub-systems (e.g., one or more commands to the imaging tool 102 or to any of the components of the imaging tool 102, or one or more outputs displayed on the user interface 120) by a transmission medium that may include wireline and/or wireless portions. In this regard, the transmission medium may serve as a data link between the controller 110 and other subsystems of the system 100. In another embodiment, the controller 110 is configured to send data to external systems via a transmission medium (e.g., network connection).

In one example, a detector of the imaging tool 102 may be coupled to the controller 110 in any suitable manner (e.g., by one or more transmission media indicated by the dotted line shown in FIG. 1A) such that the controller 110 may receive the output generated by the detector. By way of another example, if the imaging tool 102 includes more than one detector, the controller 110 may be coupled to the multiple detectors as described above. It is noted herein the controller 110 may be configured to detect one or more defects on the sample 104 using detection data collected and transmitted by the imaging tool 102, utilizing any method and/or algorithm known in the art to detect defects on the wafer. For example, the imaging tool 102 may be configured to accept instructions from another subsystem of the system 100 including, but not limited to, the controller 110. Upon receiving the instructions from the controller 110, the imaging tool 102 may perform an inspection process at the locations of the sample 104 identified in the provided instructions (i.e., the inspection recipe), transmitting the results of the inspection process to the controller 110.

In one embodiment, the set of program instructions 116 are programmed to cause the one or more processors 112 to annotate one or more sets of design data with electrical design properties. For example, the set of program instructions 116 may be programmed to cause the one or more processors 112 to receive one or more sets of design data. By way of another example, the set of program instructions 116 may be programmed to cause the one or more processors 112 to receive a selection of a pattern of interest in the one or more sets of design data. By way of another example, the set of program instructions 116 may be programmed to cause the one or more processors 112 to annotate the selected pattern of interest with one or more electrical design properties. By way of another example, the set of program instructions 116 may be programmed to cause the one or more processors to annotate one or more repeats of the selected pattern of interest with the one or more electrical design properties.

It is noted herein that the controller 110 may annotate the patterns of interest with one or more sets of design data with either electrical design properties stored in memory 114 or with user-inputted electrical design properties. It is further noted herein the controller 110 may auto-annotate patterns of interest, or alternatively annotate the patterns of interest following feedback from a user via the user interface 120.

In another embodiment, the set of program instructions 116 alternatively or in addition are programmed to cause the one or more processors 112 to analyze sample inspection results from the imaging tool 102 and classify one or more defects within the results. For example, the set of program instructions 116 may be programmed to cause the one or more processors 112 to receive one or more images of a selected region of a sample. By way of another example, the set of program instructions 116 may be programmed to cause the one or more processors 112 to receive one or more sets of design data associated with the selected region of the sample. By way of another example, the set of program instructions 116 may be programmed to cause the one or more processors 112 to locate one or more defects in the one or more images of the selected region of the sample. By way of another example, the set of program instructions 116 may be programmed to cause the one or more processors 112 to retrieve one or more corresponding patterns of interest annotated with electrical design properties from the one or more sets of design data. By way of another example, the set of program instructions 116 may be programmed to cause the one or more processors 112 to classify the one or more defects in the one or more images of the selected region of the sample based on the one or more annotated electrical design properties.

It is noted herein that the controller 110 may automatically classify the defects based on the electrical design properties of the one or more sets of design data. In addition, the controller 110 may classify the defects based on the electrical design properties of the one or more sets of design data following feedback from a user via the user interface 120.

In one embodiment, the one or more processors 112 of controller 110 include any one or more processing elements known in the art. In this sense, the one or more processors 112 may include any microprocessor device configured to execute algorithms and/or instructions. For example, the one or more processors 112 may consist of a desktop computer, mainframe computer system, workstation, image computer, parallel processor, vehicle on-board computer, handheld computer (e.g. tablet, smartphone, or phablet), or other computer system (e.g., networked computer) configured to execute a program configured to operate the system 100, as described throughout the present disclosure. It should be recognized that the steps described throughout the present disclosure may be carried out by a single computer system or, alternatively, multiple computer systems. In general, the term "processor" may be broadly defined to encompass any device having one or more processing elements, which execute the program instructions 116 from a non-transitory memory medium (e.g., memory 114). Moreover, different subsystems of the system 100 (e.g., imaging tool 102 or user interface 120) may include processor or logic elements suitable for carrying out at least a portion of the steps described throughout the present disclosure. Therefore, the above description should not be interpreted as a limitation on the present invention but merely an illustration.

In one embodiment, the memory medium 114 of controller 110 includes any storage medium known in the art suitable for storing the program instructions 116 executable by the associated one or more processors 112. For example, the memory medium 114 may include a non-transitory memory medium. For instance, the memory medium 114 may include, but is not limited to, a read-only memory, a random access memory, a magnetic or optical memory device (e.g., disk), a magnetic tape, a solid state drive and the like. In another embodiment, it is noted herein that the memory 114 is configured to provide display information to a display device 122 and/or the output of the various steps described herein. It is further noted that memory 114 may be housed in a common controller housing with the one or more processors 112. In an alternative embodiment, the memory 114 may be located remotely with respect to the physical location of the processors 112 and controller 110. For instance, the one or more processors 112 of controller 110 may access a remote memory (e.g., server), accessible through a network (e.g., internet, intranet and the like). In another embodiment, the memory medium 114 stores the program instructions 116 for causing the one or more processors 112 to carry out the various steps described through the present disclosure.

In one embodiment, the display device 122 includes any display device known in the art. For example, the display device may include, but is not limited to, a liquid crystal display (LCD). By way of another example, the display device may include, but is not limited to, an organic light-emitting diode (OLED) based display. By way of another example, the display device may include, but is not limited to a cathode ray tube (CRT) display. Those skilled in the art should recognize that a variety of display devices may be suitable for implementation in the present invention and the particular choice of display device may depend on a variety of factors, including, but not limited to, form factor, cost, and the like. In a general sense, any display device capable of integration with the user input device (e.g., touchscreen, bezel mounted interface, keyboard, mouse, trackpad, and the like) is suitable for implementation in the present invention.

In one embodiment, the user input device 124 includes any user input device known in the art. For example, user input device 124 may include, but is not limited to, a keyboard, a keypad, a touchscreen, a lever, a knob, a scroll wheel, a track ball, a switch, a dial, a sliding bar, a scroll bar, a slide, a handle, a touch pad, a paddle, a steering wheel, a joystick, a bezel input device or the like. In the case of a touchscreen interface, those skilled in the art should recognize that a large number of touchscreen interfaces may be suitable for implementation in the present invention. For instance, the display device 122 may be integrated with a touchscreen interface, such as, but not limited to, a capacitive touchscreen, a resistive touchscreen, a surface acoustic based touchscreen, an infrared based touchscreen, or the like. In a general sense, any touchscreen interface capable of integration with the display portion of a display device is suitable for implementation in the present invention. In another embodiment, the user input device 124 may include, but is not limited to, a bezel mounted interface.

The embodiments of the system 100 illustrated in FIG. 1A and FIG. 1B may be further configured as described herein. In addition, the system 100 may be configured to perform any other steps(s) of any of the method embodiment(s) described herein.

Figure 2:
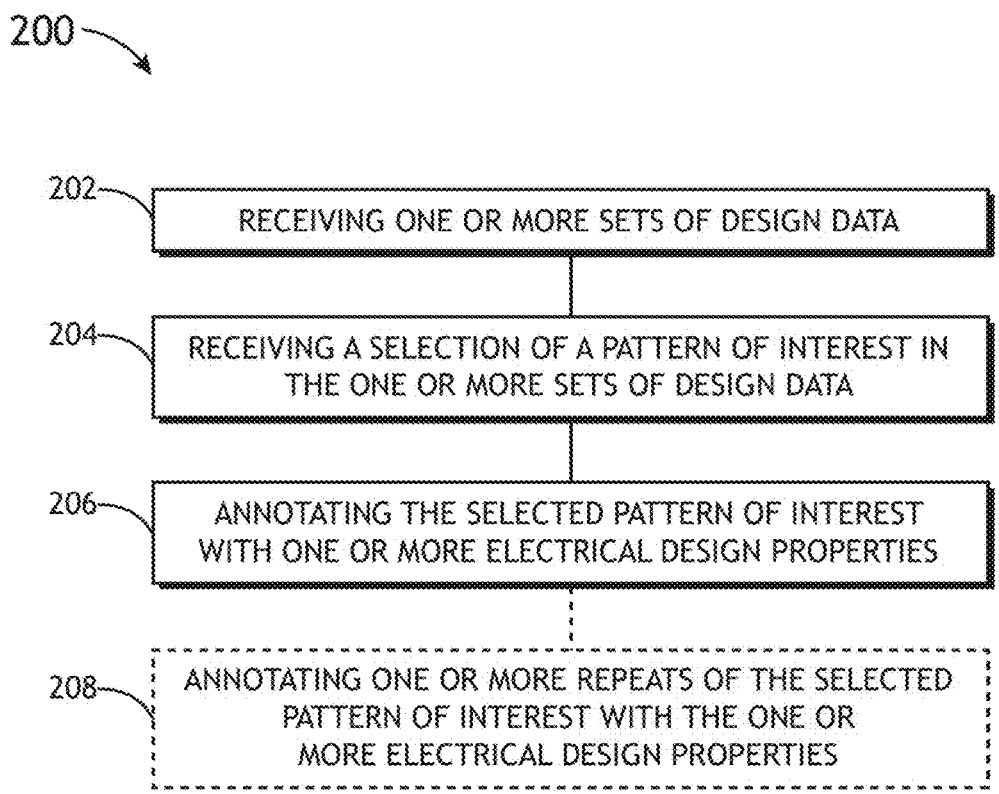
FIG. 2 illustrates a process flow diagram of a method for annotating one or more sets of design data with one or more electrical design properties for defect classification, in accordance with the present disclosure.

FIG. 2 illustrates a process flow diagram depicting a method 200 for annotating one or more sets of design data with electrical properties for defect classification. The method may also include any other step(s) that can be performed by the output acquisition subsystem and/or computer subsystem(s) or system(s) described herein. The steps may be performed by one or more computer systems, which may be configured according to any of the embodiments described herein. It is noted herein that the steps of method 200 may be implemented all or in part by the system 100. It is recognized, however, that the method 200 is not limited to the system 100 in that additional or alternative system-level embodiments may carry out all or part of the steps of method 200.

In a step 202, one or more sets of design data are received. For example, the one or more sets of design data may be in RDF format. In one embodiment, a set of design data includes one or more sets of layers. In another embodiment, a layer includes one or more sets of shapes. In another embodiment, a shape is a polygon. In another embodiment, the one or more sets of design data are displayed on the user interface 120.

In a step 204, a selection of a pattern of interest (POI) in the one or more sets of design data is received. In one embodiment, various regions within one or more sets of design data are analyzed. For example, the one or more sets of design data may be displayed on the display device 122 of the user interface 120. By way of another example, a user may zoom in and out of the one or more sets of design data via the user input 124 of the user interface 120. In another embodiment, one or more patterns of interest are identified within the one or more sets of design data. In another embodiment, a particular pattern of interest is selected from the one or more patterns of interest. For example, the particular pattern of interest may be selected by the user via the user input 124 of the user interface 120. By way of another example, the particular pattern of interest may include a specific macro, a cell of interest, or an arbitrary pattern of interest. By way of another example, the pattern of interest may be represented by one or more polygons. In another embodiment, the selected pattern of interest is displayed on the user interface 120.

In a step 206, the selected pattern of interest is annotated with one or more electrical design properties. In one embodiment, a user analyzes the selected pattern of interest. For example, the user may zoom in and out of the selected pattern of interest to view its one or more polygons. In another embodiment, the user selects a portion of the polygons of the selected pattern of interest. In another embodiment, the user selects one or more electrical design properties to annotate to the selected portion of the polygons of the selected pattern of interest. For example, the one or more electrical design properties may be stored within memory 114 of the controller 110 and displayed on the display 122 of the user interface 120. For instance, the stored one or more electrical design properties may include all possible electrical design properties for any chip design known in the art. In addition, the stored one or more electrical design properties may be a condensed list of properties based on previous user selections, pre-programmed instructions implemented in response to recognition by the controller 110 of the selected pattern of interest, or recognition of a particular chip design. By way of another example, the one or more electrical design properties may be inputted by the user via the user input 124 of the user interface 120. In another embodiment, the one or more electrical design properties are displayed on the user interface 120. In another embodiment, the annotated pattern of interest is stored within the one or more sets of design data.

In an optional step 208, one or more repeated instances of the selected pattern of interest are annotated with the one or more electrical design properties. In one embodiment, a pattern search function analyzes the one or more sets of design data for repeated instances of the previously-selected pattern of interest. In another embodiment, the pattern search function annotates the repeated instances with the previously-annotated one or more electrical design properties. In another embodiment, the one or more repeated instances of the selected pattern of interest are displayed on the user interface 120. In another embodiment, the one or more electrical design properties of the one or more repeated instances of the selected pattern of interest are displayed on the user interface 120. In another embodiment, the annotated one or more repeated instances of the pattern of interest are stored within the one or more sets of design data. In another embodiment, the analysis results of the pattern search function are stored within the one or more sets of design data. It is noted herein the pattern search may not be needed if the pattern of interest is a macro or a cell of interest, but may still be implemented by the process 200 as desired.

It is noted that the steps of process 200 may be repeated for additional patterns of interest within the one or more sets of design data.

It is further noted the pattern search function may be implemented prior to storing the annotated electrical design properties of the selected pattern of interest. In this regard, all instances of the selected pattern of interest would be annotated before the annotations are stored within the one or more sets of design data. Therefore, the above description should not be interpreted as a limitation on the present invention but merely an illustration.

Annotating a selected pattern of interest within one or more sets of design data serves to provide one or more electrical design properties to use when determining the make-up of a defect during wafer inspection. In one embodiment, the electrical design properties include any of a defect-type characteristic (i.e. void, short, pinch, or the like), design sub-characteristic (i.e. a power line, a ground line, a timing function, a data function, or the like), and a level of criticality to the design (i.e. harmless, nuisance, material, and similar terms; a weighted scale system; or the like).

Figure 3:
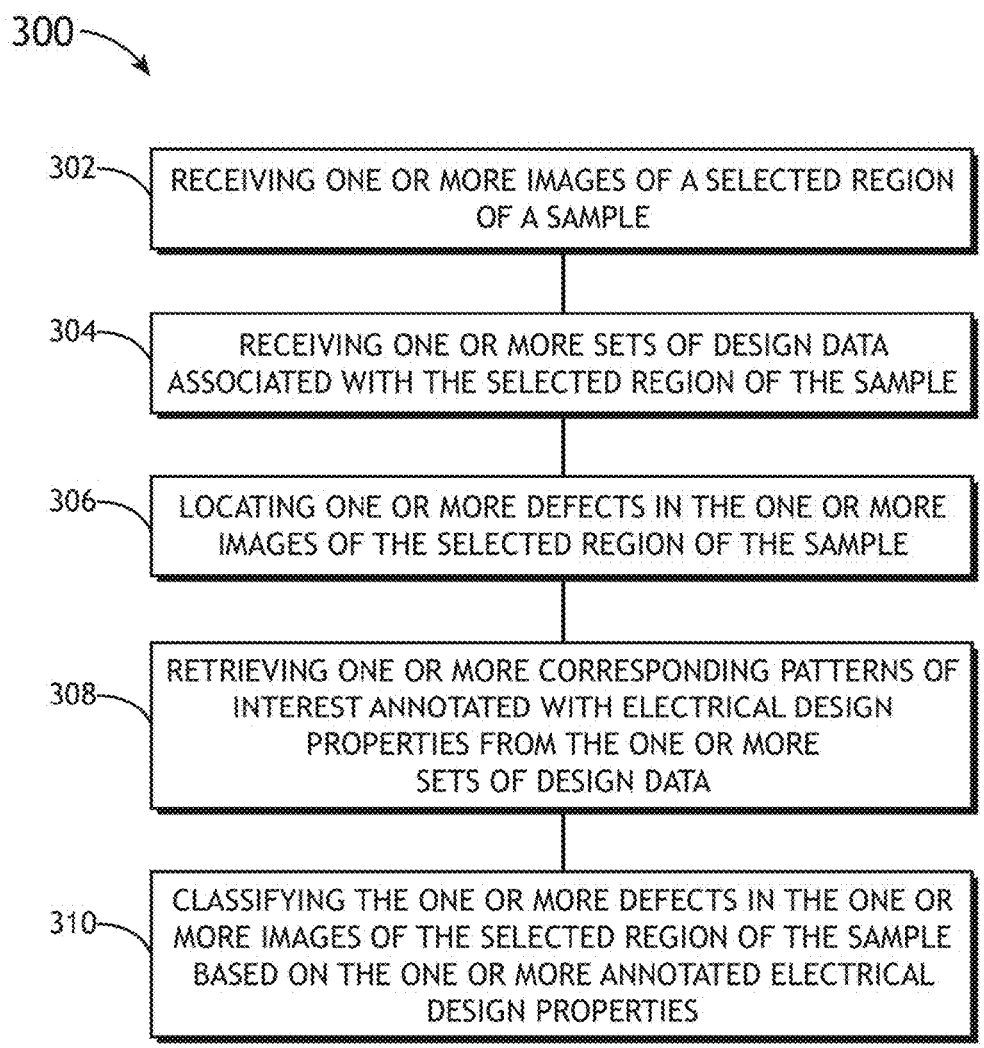
FIG. 3 illustrates a process flow diagram of a method for automatically classifying one or more defects based on electrical design properties, in accordance with the present disclosure.

FIG. 3 illustrates a process flow diagram depicting a method 300 for automatically classifying one or more defects based on electrical design properties. The method may also include any other step(s) that can be performed by the output acquisition subsystem and/or computer subsystem(s) or system(s) described herein. The steps may be performed by one or more computer systems, which may be configured according to any of the embodiments described herein. It is noted herein that the steps of method 300 may be implemented all or in part by the system 100. It is recognized, however, that the method 300 is not limited to the system 100 in that additional or alternative system-level embodiments may carry out all or part of the steps of method 300.

In a step 302, one or more images of a selected region of a sample are received. In one embodiment, the one or more images include images of one or more layers of the selected region of the sample. In another embodiment, the one or more images include images of one or more shapes within a layer of the selected region of the sample. In another embodiment, the one or more images are received by the controller 110 from the imaging tool 102. It is noted however, the one or more results from a prior wafer inspection may instead be uploaded to the controller 110 by a user. In this regard, the controller 110 may be communicatively coupled to or separate from the imaging tool 102. In another embodiment, the one or more images of one or more layers of the selected region of the sample are displayed on the user interface 120.

In a step 304, one or more sets of design data associated with the selected region of the sample are received. For example, the one or more sets of design data may be retrieved from memory 114. By way of another example, the one or more sets of design data may be received from a user. In one embodiment, the one or more sets of design data are annotated with one or more electrical design properties. In another embodiment, the one or more sets of design data are displayed on the user interface 120.

In a step 306, one or more defects in the one or more images of the selected region of the sample are located. In one embodiment, the controller 110 compares the one or more images of the selected region of the sample to the one or more sets of design data. In another embodiment, the controller 110 identifies a difference between the one or more images from the one or more sets of design data as a defect in the one or more images. In another embodiment, the one or more defects are displayed on the user interface 120.

It is noted herein the defects in the one or more images of the selected region of the sample may be located without comparing the one or more images to the one or more sets of design data, but instead may be located in step 306 by any other wafer inspection and review process known in the art. Therefore, the above description should not be interpreted as a limitation on the present invention but merely an illustration.

In a step 308, one or more corresponding patterns of interest annotated with electrical design properties are retrieved from the one or more sets of design data. For purposes of the present disclosure, a corresponding pattern of interest annotated with electrical design properties is a design clip. In another embodiment, the one or more design clips are represented by one or more polygons surrounding the location of the one or more defects in the one or more images of the selected region of the sample. In another embodiment, the one or more design clips have one or more dimensions that range from 0.250-10 microns. For example, the design clip may be 0.250×0.250 microns in area. By way of another example, the design clip may be 1×1 micron in area. By way of another example, the design clip may be 10×10 microns in area. It is noted herein that the design clip may not be square in shape, but may instead be any regular or irregular shape known in the art. Therefore, the above description should not be interpreted as a limitation on the present invention but merely an illustration. In another embodiment, the one or more electrical design properties are displayed on the user interface 120. In another embodiment, the one or more design clips include one or more annotated electrical properties. For example, the annotated electrical properties may include, but are not limited to, a defect-type characteristic, a design sub-characteristic, or a level of criticality to the design.

In a step 310, the one or more defects in the one or more images of the selected region of the sample are classified based on the one or more annotated electrical design properties. For example, the one or more defects are classified with one or more defect-type characteristic (i.e. void, short, pinch, or the like), design sub-characteristic (i.e. a power line, a ground line, a timing function, a data function, or the like), or level of criticality to the design (i.e. harmless, nuisance, material, and like terms; a weighted scale system; or the like).

It is noted that the steps of process 300 may be repeated for additional defects and corresponding patterns of interest within the one or more images of the selected region of the sample.

It is also noted that classifying one or more defects found in the one or more images resulting from wafer inspection based on defect-type characteristics and design sub-characteristics may assist a user in finding the root cause for defectivity by prioritizing yield killer defects, thus potentially decreasing the time required for inspection. In one embodiment, the design sub-characteristic of a defect enables a user to connect the defect to a specific failure in chip functionality. Examples of perceived issues include, but are not limited to, electrical intent of the defect location (e.g., defect on a power line or ground line), a missing electrical structure including, but not limited to, a contact or a via, or pinching on a critical clock net. For instance, where the selected pattern of interest is an SRAM bit cell, a defect may be characterized as a "void" and sub-characterized as a "void on a bit line in an SRAM region". Additionally, a defect may be characterized as "pinching" and sub-characterized as "pinching on an electrically critical clock net". Here, the design sub-characterization may assist a user in more quickly correlating the "pinching" defect to a chip timing failure.

It is further noted that the defining defects in terms of criticality to the design may minimize product waste and potential damage to both the consumer and the manufacturer or retailer. For example, a defect may be considered a material failure or a nuisance depending on how a chip's function is impacted. In correctly assessing the criticality of the defect, a chip with a nuisance defect may be treated differently than a chip with a material defect by the manufacturer or retailer. For instance, a chip with a nuisance defect may be sold to a desiring market at a lower price instead of being scrapped in bulk with the chips containing a material defect.

In contemplated embodiments, the controller 110 requires input from a user during the classification process 300. For example, the user may toggle between the one or more sets of design data and the one or more images of the selected region of the sample on the display 122 via the user input 124. For instance, the display 122 may display both the one or more images of the sample and one or more sets of design data for side-to-side comparison during the locating of one or more defects. In addition, the display 122 may display the one or more images of the sample and one or more sets of design data in overlapping graphical windows. By way of another example, the controller 110 may display a located defect and the corresponding pattern of interest with annotated electrical property data on the display 122 in response to a user prompt. By way of another example, the controller 110 may require input from the user following the displaying of a defect and corresponding pattern of interest annotated with one or more electrical design properties before continuing the classification process 200 including, but not limited to, an "annotate", "save", or "continue" prompt. Therefore, the above description should not be interpreted as a limitation on the present invention but merely an illustration.

Although particular embodiments of this invention have been illustrated, it is apparent that various modifications and embodiments of the invention may be made by those skilled in the art without departing from the scope and spirit of the foregoing disclosure. Accordingly, the scope of the invention should be limited only by the claims appended hereto.

What is claimed:

1. A system for automatically classifying one or more defects based on electrical design properties, comprising:
   an imaging tool configured to acquire one or more images of a selected region of a sample, wherein the imaging tool including a detector, an illumination source, and one or more optical elements;
   a user interface, wherein the user interface includes a display and a user input device; and
   a controller including one or more processors configured to execute a set of program instructions stored in memory, wherein the program instructions are configured to cause the one or more processors to:
      receive the one or more images of the selected region of the sample from the imaging tool;
      receive a design file associated with the selected region of the sample, wherein the design file includes one or more sets of design data, wherein a set of design data includes one or more layers, wherein a layer includes one or more sets of shapes;
      locate one or more defects in the one or more images of the selected region of the sample;
      retrieve one or more patterns of interest from the design file, wherein the one or more patterns of interest include one or more shapes surrounding the location of the one or more defects, wherein the one or more patterns of interest include one or more annotated electrical design properties; and
      automatically classify the one or more defects in the one or more images of the selected region of the sample based on the one or more annotated electrical design properties by comparing the one or more defects to the one or more patterns of interest.

2. The system for automatically classifying one or more defects based on electrical design properties in claim 1, wherein the imaging tool includes one or more of:
   an optical inspection tool or an SEM review tool.

3. The system for automatically classifying one or more defects based on electrical design properties in claim 1, wherein a shape is a polygon.

4. The system for automatically classifying one or more defects based on electrical design properties in claim 1, wherein the program instructions are further configured to cause the one or more processors to:
   display the automatically-classified one or more defects.

5. The system for automatically classifying one or more defects based on electrical design properties in claim 1, wherein the one or more patterns of interest have at least one dimension that ranges from 0.250-10 microns.

6. The system for automatically classifying one or more defects based on electrical design properties in claim 1, wherein the one or more annotated electrical properties includes at least one of a defect-type characteristic, a design sub-characteristic, or a level of criticality to the design.

7. The system for automatically classifying one or more defects based on electrical design properties in claim 1, wherein the program instructions are further configured to cause the one or more processors to:
   generate the one or more sets of design data;
   receive a selection of the one or more patterns of interest in the one or more sets of design data from the user input device;
   annotate the one or more patterns of interest in the one or more sets of design data with one or more electrical design properties; and
   generate the design file from the one or more patterns of interest including the one or more annotated electrical design properties.

8. The system for automatically classifying one or more defects based on electrical design properties in claim 7, wherein the program instructions are further configured to cause the one or more processors to:
   implement a pattern search function, wherein the pattern search function annotates one or more repeats of the one or more patterns of interest with the one or more electrical design properties.

9. The system for automatically classifying one or more defects based on electrical design properties in claim 8, wherein the program instructions are further configured to cause the one or more processors to:
   store the annotated one or more repeats of the one or more patterns of interest.

10. The system for automatically classifying one or more defects based on electrical design properties in claim 7, wherein the program instructions are further configured to cause the one or more processors to:
    display the one or more sets of design data on the display of the user interface.

11. The system for automatically classifying one or more defects based on electrical design properties in claim 7, wherein the program instructions are further configured to cause the one or more processors to:
    display the one or more electrical design properties.

12. The system for automatically classifying one or more defects based on electrical design properties in claim 11, wherein the program instructions are further configured to cause the one or more processors to:
    receive a selection of the displayed one or more electrical design properties.

13. The system for automatically classifying one or more defects based on electrical design properties in claim 7, wherein the program instructions are further configured to cause the one or more processors to:
    store the annotated one or more patterns of interest.

14. The system for automatically classifying one or more defects based on electrical design properties in claim 1, further comprising:
- a semiconductor fabrication process tool configured to perform one or more semiconductor fabrication processes of a semiconductor device production process,
- wherein the program instructions are further configured to cause the one or more processors to:
  - providing one or more control signals to adjust at least one of the imaging tool or the semiconductor fabrication process tool to improve performance of one or more semiconductor device production processes.

15. A system for annotating one or more sets of design data with electrical design properties for defect classification, comprising:
- a user interface, wherein the user interface includes a display and a user input device; and
- a controller including one or more processors configured to execute a set of program instructions stored in memory, wherein the program instructions are configured to cause the one or more processors to:
  - generate one or more sets of design data, wherein a set of design data includes one or more layers, wherein a layer includes one or more sets of shapes;
  - receive a selection of one or more patterns of interest in the one or more sets of design data from the user input device;
  - annotate the one or more patterns of interest in the one or more sets of design data with one or more electrical design properties; and
  - generate a design file from the one or more patterns of interest including the one or more annotated electrical design properties,
  - wherein the one or more patterns of interest including the one or more annotated electrical properties are utilizable to automatically classify one or more defects in one or more images of a selected region of a sample,
  - wherein the one or more images are acquirable by an imaging tool including a detector, an illumination source, and one or more optical elements.

16. The system for annotating one or more sets of design data in claim 15, wherein the program instructions are further configured to cause the one or more processors to:
- implement a pattern search function, wherein the pattern search function annotates one or more repeats of the one or more patterns of interest with the one or more electrical design properties.

17. The system for annotating one or more sets of design data in claim 16, wherein the program instructions are further configured to cause the one or more processors to:
- store the annotated one or more repeats of the one or more patterns of interest.

18. The system for annotating one or more sets of design data in claim 15, wherein the program instructions are further configured to cause the one or more processors to:
- display the one or more sets of design data on the display of the user interface.

19. The system for annotating one or more sets of design data in claim 15, wherein the program instructions are further configured to cause the one or more processors to:
- display the one or more electrical design properties.

20. The system for annotating one or more sets of design data in claim 19, wherein the program instructions are further configured to cause the one or more processors to:
- receive a selection of the displayed one or more electrical design properties.

21. The system for annotating one or more sets of design data in claim 19, wherein the displayed one or more electrical design properties are stored in memory.

22. The system for annotating one or more sets of design data in claim 19, wherein the displayed one or more electrical design properties are received from a user.

23. The system for annotating one or more sets of design data in claim 15, wherein the one or more electrical design properties includes at least one of a defect-type characteristic, a design sub-characteristic, or a level of criticality to the design.

24. The system for annotating one or more sets of design data in claim 15, wherein the program instructions are further configured to cause the one or more processors to:
- store the annotated one or more patterns of interest.

25. A method for automatically classifying one or more defects based on electrical design properties, comprising:
- receiving one or more images of a selected region of a sample from an imaging tool, wherein the imaging tool is configured to acquire the one or more images of the selected region of the sample, wherein the imaging tool includes a detector, an illumination source, and one or more optical elements;
- receiving a design file associated with the selected region of the sample, wherein the design file includes one or more sets of design data, wherein a set of design data includes one or more layers, wherein a layer includes one or more sets of shapes;
- locating one or more defects in the one or more images of the selected region of the sample;
- retrieving one or more patterns of interest from the design file, wherein the one or more patterns of interest include one or more shapes surrounding the location of the one or more defects, wherein the one or more patterns of interest include one or more annotated electrical design properties; and
- automatically classifying the one or more defects in the one or more images of the selected region of the sample based on the one or more annotated electrical design properties by comparing the one or more defects to the one or more patterns of interest.

26. The method for automatically classifying one or more defects based on electrical design properties in claim 25, further comprising:
- displaying the automatically-classified one or more defects.

27. The method for automatically classifying one or more defects in claim 25, further comprising:
- generating one or more sets of design data;
- receiving a selection of the one or more patterns of interest in the one or more sets of design data from the user input device;
- annotating the one or more patterns of interest in the one or more sets of design data with one or more electrical design properties; and
- generating the design file from the one or more patterns of interest including the one or more annotated electrical design properties.

28. The method for automatically classifying one or more defects in claim 27, further comprising:
- implementing a pattern search function, wherein the pattern search function annotates one or more repeats of the one or more patterns of interest with the one or more electrical design properties.

29. The method for automatically classifying one or more defects in claim 28, further comprising:

storing the annotated one or more repeats of the one or more patterns of interest.

30. The method for automatically classifying one or more defects in claim 27, further comprising:
displaying the one or more sets of design data on the display of the user interface.

31. The method for automatically classifying one or more defects in claim 27, further comprising:
displaying the one or more electrical design properties.

32. The method for automatically classifying one or more defects in claim 31, further comprising:
receiving a selection of the displayed one or more electrical design properties.

33. The method for automatically classifying one or more defects in claim 27, further comprising:
storing the annotated one or more patterns of interest.

34. A method for annotating one or more sets of design data with electrical design properties for defect classification, comprising:
generating one or more sets of design data, wherein a set of design data includes one or more layers, wherein a layer includes one or more sets of shapes;
receiving a selection of one or more patterns of interest in the one or more sets of design data from the user input device; and
annotating the one or more patterns of interest in the one or more sets of design data with one or more electrical design properties; and
generating a design file from the one or more patterns of interest including the one or more annotated electrical design properties,
wherein the one or more patterns of interest including the one or more annotated electrical properties are utilizable to automatically classify one or more defects in one or more images of a selected region of a sample,
wherein the one or more images are acquirable by an imaging tool including a detector, an illumination source, and one or more optical elements.

35. The method for annotating one or more sets of design data with electrical design properties in claim 34, comprising:
implementing a pattern search function, wherein the pattern search function annotates one or more repeats of the one or more patterns of interest with the one or more electrical design properties.

36. The method for annotating one or more sets of design data in claim 35, further comprising:
storing the annotated one or more repeats of the one or more patterns of interest.

37. The method for annotating one or more sets of design data in claim 34, further comprising:
displaying the one or more sets of design data on the display of the user interface.

38. The method for annotating one or more sets of design data in claim 34, further comprising:
displaying the one or more electrical design properties associated with the selected pattern of interest.

39. The method for annotating one or more sets of design data in claim 38, further comprising:
receiving a selection of the displayed one or more electrical design properties.

40. The method for annotating one or more sets of design data in claim 34, further comprising:
storing the annotated one or more patterns of interest.

* * * * *